United States Patent [19]

Yamada

[11] Patent Number: 4,863,749
[45] Date of Patent: Sep. 5, 1989

[54] PROCESS FOR THE PRODUCTION OF A LOW-CHOLESTEROL ALL-VEGETABLE MEAT ANALOG

[75] Inventor: Tetsu Yamada, Osaka, Japan

[73] Assignee: Otsuka Foods Co., Ltd., Osaka, Japan

[21] Appl. No.: 184,868

[22] Filed: Apr. 22, 1988

Related U.S. Application Data

[63] Continuation-in-part of Ser. No. 108,605, Oct. 15, 1987, abandoned.

[51] Int. Cl.$^4$ ............................................... A23J 3/00
[52] U.S. Cl. .................................... 426/241; 426/104; 426/274; 426/656; 426/802
[58] Field of Search ............... 426/104, 656, 802, 274, 426/241, 634

[56] References Cited

U.S. PATENT DOCUMENTS 4,376,134  3/1983  Kumar ................................. 426/656
4,495,205  1/1985  Brander ............................... 426/104

*Primary Examiner*—Donald E. Czaja
*Assistant Examiner*—Celine T. Callahan
*Attorney, Agent, or Firm*—Sughrue, Mion, Zinn, Macpeak & Seas

[57] ABSTRACT

Disclosed is a process for the production of a low cholesterol all-vegetable meat analog from texturized vegetable protein (TVP) resembling a natural meat product in appearance, texture, flavor, cooking characteristics, and eating qualities, comprising:
 (A) hydrating TVP;
 (B) disintegrating the TVP;
 (C) washing the TVP;
 (D) dehydrating the TVP;
 (E) denaturing and dehydrating, or dehydrating, the TVP from step (D) and combining the TVP with a hydrated binder and additional ingredients, or combining the TVP from step (D) with a binder and additional ingredients without hydration, thereby giving a mixture of the TVP, binder and additional ingredients having a desired range of moisture level;
 (F) stuffing the mixture into a casing; and
 (G) heat-setting and sterilizing the stuffed mixture for a time and at a temperature effective to complete binding and sterilization.

28 Claims, No Drawings

# PROCESS FOR THE PRODUCTION OF A LOW-CHOLESTEROL ALL-VEGETABLE MEAT ANALOG

This application is a continuation-in-part of application Ser. No. 108,605 filed Oct. 15, 1987 now abandoned.

FIELD OF THE INVENTION

This invention relates to various types of all-vegetable meat analogs which resemble natural products made of various meats in appearance, cooking characteristics, flavor, eating qualities and texture but have the added advantage of containing little or no cholesterol and fat. The invention further relates to a process for preparing such meat analog products.

BACKGROUND OF THE INVENTION

The food industry has endeavored to develop high protein, low cost, chewy proteinaceous product as a substitute or an extender for meat products. For the past decades, extensive variations in technique and formulation have been developed depending upon the meat product to be simulated.

An early method for producing simulated meat is the fiber spinning technique, which resembles the spun fiber method of making synthetic textile fibers. In this method, an alkaline protein solution is prepared which is extruded through spinnerettes into an acidic coagulating bath which causes precipitation into a filament form. These filaments are assembled into a meat analog by use of binding materials.

Details regarding the techniques are disclosed, for example, in U.S. Pat. Nos. 2,682,466, granted June 29, 1954, to Boyer; and 3,482,998, granted Dec. 9, 1969, to Carroll, et al. Another method to obtain chewy meat analog is disclosed in U.S. Pat. Nos. 2,802,737, 2,813,024, 2,813,025, 2,830,902 and 2,883,651, granted to Anson and Pader.

The process is characterized by forming a solution of protein which is then precipitated under agitation at elevated temperature by lowering the pH of the solution to about 6.0. The resulting precipitate may then be admixed with a binder and stirred into a uniform piece which can be shaped into any form desired, such as strands. The resultant strands are autoclaved to give rise to the chewy protein mass.

Rusoff et al. in U.S. Pat. No. 3,047,395, patented July 31, 1962, has disclosed a process for preparing a meatlike protein product having a shred-like texture. In this process, hydrated protein material is rapidly heated to a temperature of 300°-400° F. with agitation, then resulting oriented and coagulated protein material is cooled as rapidly as possible.

Technique predominant for these years is thermal plastic extrusion process, in which a mixture of a protein material, water, flavorings and other ingredients are extruded at very high temperatures and pressures. As the extrudate enters into a medium of reduced pressure (usually atmospheric), it expands to form a fibrous cellular structure. On rehydration, texturized vegetable protein (TVP) thus prepared possesses an appearance and mouthfeel similar to cooked meat pieces. Patents disclosing thermal plastic extrusion techniques for the formation of TVP meat analog are disclosed in U.S. Pat. No. 3,488,770, granted Jan. 6, 1970, to Atkinson; and U.S. Pat. No. 3,496,858, granted Feb. 24, 1970, to Jenkins. TVP is commercially available in various forms such as particles, grits, granules, fibrous extrudate chunks or fibrous extrudate shreds. These particles or pieces must be assembled into familiar meat forms to provide meat analog products.

Heretofore, a variety of techniques to obtain various meat analog products like hamburger patty, beef chunk, loaf, sausage and so forth have been disclosed. Details regarding the techniques are shown, for example, in U.S. Pat. Nos. 4,061,784, granted Dec. 6, 1977, to Youngquest, 4,376,134, granted Mar. 8, 1983, to Kumer, and 4,495,205 granted Jan. 22, 1985, to Brander, et al.

However, no known process has been developed which allows the ad libitum production of various types of meat analogs which are low in cholesterol, have the appearance and the eating quality quite similar to those of real meat products. Especially, the development of a production method for simulated meat block, from which chunk, strip, cube, or slab can be cut off without restraint, expands the culinary uses.

According to the present invention, a wide variety of products may be made with a relatively simple process. For example, all-vegetable meat analogs which resemble hamburger patties, meat loaves, hams, and sausages, as well as cooked meat blocks of mammals, fowl, or fish are prepared easily.

The present invention utilizes a binder system and a novel process which enables the development of a texture even more closely resembling that intended to be simulated.

Further objects and advantages will become apparent to one skilled in the art from the following description of this invention.

SUMMARY OF THE INVENTION

It is possible to produce a wide variety of all-vegetable meat analogs which are low in cholesterol and have an appearance and eating quality quite similar to those of real meat products by utilizing the novel process as set forth in accordance with the present invention.

More particularly, this invention provides a process for forming an all-vegetable meat analog comprising:
(A) hydrating TVP;
(B) disintegrating the TVP;
(C) washing the TVP;
(D) dehydrating the TVP;
(E) denaturing and dehydrating, or dehydrating, the TVP from step (D) and then combining the TVP with a hydrated binder and additional ingredients, or combining the TVP from step (D) with a binder and additional ingredients without hydration, thereby giving a mixture of the TVP, binder and additional ingredients having a desired range of moisture level;
(F) stuffing the mixture into a casing; and
(G) heat-setting and sterilizing the stuffed mixture for a time and at a temperature effective to complete the binding and sterilization.

The order of steps (B) and (C) may be reversed, and steps (B) and (D) may be conducted simultaneously.

In one embodiment of the invention, a process for forming an all vegetable meat-analog is provided which comprises:
(a) hydrating and washing TVP for removal of undesired flavor associated with soybean;
(b) additionally washing and simultaneously dehydrating and disintegrating the hydrated and washed TVP;

(c) denaturing and dehydrating the TVP for a time and at a temperature effective to attain the desired range of moisture level;
(d) combining the TVP with a binder and an additional ingredient;
(e) stuffing the mixture into a casing; and
(f) heat-setting and sterilizing the stuffed mixture for a time and at a temperature effective to complete binding and sterilization.

Generally, however, there is provided in step (E) a mixture of TVP and a binder and additional ingredients which has a specific range of moisture level of about 65 to about 75% on a weight basis. Such moisture controlled mixture is prepared either (i) by denaturing and dehydrating, or dehydrating, the TVP from step (D) and then combining the TVP with a hydrated binder and additional ingredients, or (ii) by combining the TVP from step (D) with a binder and additional ingredients without hydration, depending on the hydration capacity of the starting TVP and the moisture level of the TVP from step (D).

The hydration capacity of the starting TVP usually ranges from about 3 to about 10, and the moisture level of the TVP from step (D) is usually adjusted to about 70 to about 85% on a weight basis.

Before combining with the binder and additional ingredients, the TVP may optionally be subjected to a step for adjusting particle size in accordance with the product to be simulated.

The mixture of the TVP, binder and additional ingredients can be formed into any shape desired according to the product to be simulated.

The shaped product stuffed into a casing is then heat-set, giving the contemplated meat analog product.

Cooling and freezing of the sterilized and heat-set product can be carried out for extended period of storage.

The frozen product can be thawed, cut into any shape desired, and cooked.

The novel features of the invention, both as to the product and method of making such product, together with the further objectives and advantages thereof, will be understood from the following description in which a preferred method of practicing the invention is illustrated.

DETAILED DESCRIPTION

By employing the process of the present invention, a variety of all-vegetable meat analogs can be prepared easily, having the texture, cooking and eating quality closely resembling the meat product being simulated.

In the specification and claims, the term "texturized vegetable protein (TVP)" is intended to include a defatted product which can be prepared from soy flour, soy protein concentrate, soy protein isolate or the like that may optionally be admixed with starch and/or wheat gluten, and which has texture imparted by a thermoplastic extrusion process under conditions of high temperature and high pressure generated from an extruder. Such TVPs are described in U.S. Pat. Nos. 3,488,770, 4,061,784, 4,376,134 and the like or can be prepared by the methods disclosed in these patents.

In the present invention, it is possible to use various TVPs which are commercially available in forms such as particles, grits, granules, fibrous extrudate chunks, and fibrous extrudate shreds. Among these TVPs, it is preferred, however, to utilize fibrous extrudate chunks or fibrous extrudate shreds having a hydration capacity of from about 3 to 10 times their weight of water. It is preferable that the fibers constituting such fibrous extrudate chunks or fibrous extrudate shreds are about 20 to about 50 mm in length. The term "hydration capacity" as used herein refers to the total amount of water the dry protein material is able to hold and is determined by soaking dry TVP in excess water for 30 minutes at room temperature and then draining for 5 minutes, and is calculated by the following equation:

$$\text{hydration capacity} = (V - V_o)/V_o$$

in which V is the weight of hydrated TVP and $V_o$ is the weight of dry TVP before hydration.

According to one embodiment of the invention, the foregoing steps (A) through (D) may be conducted by the following method. The method comprises:
(a) hydrating and washing TVP for removal of undesired flavor associated with soybean; and
(b) additionally washing and simultaneously dehydrating and disintegrating the hydrated and washed TVP.

The hydration of TVP is usually carried out by soaking TVP in sufficient water for about 30 to 60 minutes at room temperature. The time required for hydration can be shortened by use of hot or warm water. The TVP is completely hydrated to the full extent.

The hydrated TVP is then washed to eliminate the undesirable flavor associated with soy by an appropriate conventional apparatus such as a rice washer. When a rice washer is used, the TVP is introduced into the apparatus by pumping with water and the TVP rolls down along the inside of inclined rotating steel net drum in which the sprinkler is installed, while the drainage is released therefrom.

The washed TVP is then fed to the horizontal continuous centrifuge with water for further washing, as well as simultaneous dehydration and disintegration. The centrifugation is carried out at a centrifugal force ranging from about 150 to 700 G, preferably from about 200 to 300 G, to attain the preferable range of dehydration and disintegration.

The collision of dehydrated TVP, expelled from a centrifugal basket by a differential screw, against collection hood results in the disintegration of TVP as a bundle of parallel fibers. The resultant diameter or the dimension of the sides of the cross-sectioned columnar or pillar-shaped fiber bundle preferably ranges from about 2 to 15 mm. A size of the cross-sectioned fiber bundle greater than 15 mm often prevents the dehydration and denaturation considerably during heat treatment in step (E), with the result that the final product is soft, less chewy, crumbly and coarse in its texture and in appearance. The reduction of the length of fiber bundle by fracture during centrifugation, due to excessive centrifugal force, should be avoided for better heat treatment, especially for better handling on continuous F.I.R. irradiation in step (E) as well as for the formation of more desirable network through random alignment and configuration of bundles in the binding process. Disintegrated TVP having a diameter or a dimension of the side less than 2 mm or a length shortened by fracture may be present in a small amount such that the advantages of the invention will not be impaired.

According to another embodiment of the invention, the foregoing steps (A) through (D) may also be carried out by the following method. The method comprises:
(i) hydrating TVP;

(ii) disintegrating the TVP with use of a disintegrating means;
(iii) washing the TVP with use of a washing means for removal of undesired flavor associated with soybean; and
(iv) dehydrating the disintegrated and washed TVP with use of a dehydrating means,
wherein the order of the disintegrating step (ii) and washing step (iii) may be reversed.

The hydration step (i) may be conducted in the same manner as in the foregoing embodiment.

The disintegrating step (ii) may be conducted using a means for disintegrating lumped materials such as lumped sugar. Alternatively, the disintegrating step may preferably be carried out using a pump capable of exerting a beating or disintegrating effect, such as a pump having an impeller therein. When such pump is used, the hydrated TVP and water is pumped out from a vessel containing the hydrated TVP and water via such pump and recycled to said vessel. This recycling is continued for a time sufficient to disintegrate the hydrated TVP with substantially no reduction of the length of the fiber bundle by fracture. During this recycling, additional water may be added to the vessel while draining so as to effect additional washing of the TVP. Irrespective of a means for disintegration employed, it is preferable to disintegrate the hydrated TVP such that the cross-sectional area of the resulting TVP fiber bundle as hydrated will not be too small and will mostly range from about 0.05 to about 4.0 cm$^2$, preferably from about 0.05 to about 3.0 cm$^2$.

The washing step (iii) may also be conducted with use of a means for washing conventionally used in the art, and the foregoing rice washer may also be used.

As mentioned above, the order of the disintegrating step (ii) and the washing step (iii) may be reversed. Therefore these steps may be conducted in the order of (ii) and (iii) or in the order of (iii) and (ii).

The disintegrated and washed TVP is then hydrated in step (iv) with the use of a means for dehydration conventionally used in the art. As the means for dehydration, various dehydration means can be used, but it is preferable to use a means for dehydration having substantially no disintegrating effect, such as commonly used vertical batch-type centrifuge, belt press and the like.

According to a modification of the above embodiment of the invention, the hydrated TVP from the hydrating step (i) may be coarsely disintegrated with use of a pump such as one mentioned above to such an extent that the cross-sectional area of the resulting TVP fiber bundle as hydrated will generally range from about 1 to about 4 cm$^2$, and then be fed to a horizontal continuous centrifuge for simultaneously conducting dehydration and disintegration such that the resultant diameter or the dimension of the sides of the cross-sectioned fiber bundle can range from about 2 to 15 mm.

In any event, irrespective of how steps (A) through (D) may be conducted, it is preferable that the disintegrated and dehydrated TVP after passing steps (A) through (D) has the size and shape such that the diameter or dimension of the sides of the cross-sectioned columnar or piller-shaped fiber bundle ranges from about 2 to about 15 mm and that there is no substantial reduction of the length of the fiber bundle due to fracture.

Furthermore, it is preferable that the TVP disintegrated and dehydrated by any of the foregoing methods has a moisture level of about 70 to about 85% (% on a weight basis, the same applies hereinafter). A moisture level of greater than 85% often results in insufficient dehydration and/or proteins denaturation in subsequent step (E), and the texture of the resulting final product tends to become homogenous, soft and less chewy. The moisture level of less than 70% is difficult to attain so far as the TVP is treated in accordance with steps (A) through (D) mentioned above.

According to my research, when the starting TVP having a hydration capacity of not less than 5 to about 10, preferably of about 5.5 to about 9, is used, such TVP has high capacity of retaining water therein, and therefore it is not always easy to dehydrate such TVP to a moisture level of less than 75% by the foregoing centrifuge or the like in step (D). If such TVP is forcibly dehydrated to a moisture level of less than 75% by using a horizontal continuous centrifuge such as mentioned above, the resulting disintegrated TVP would not have the above-specified preferable size and shape. Therefore, when the starting TVP has a hydration capacity of not less than 5 to about 10, it is preferable to adjust the moisture level of disintegrated TVP to about 75 to about 85% in the dehydrating step (D). When the starting TVP has a hydration capacity of about 3 to less than 5, such TVP has a tendency of being a little more easily dehydrated compared to the TVP having a hydration capacity of not less than 5 to about 10, and therefore can be slightly more dehydrated to a moisture level within the above-specified range of about 70 to about 85% in the dehydrating step (D).

In step (E), depending on the hydration capacity of the TVP and the moisture level of the dehydrated TVP, the dehydrated TVP from step (D) is either (i) denatured and dehydrated, or simply dehydrated, and then combined with a hydrated binder and additional ingredients or (ii) directly combined with a non-hydrated binder and additional ingredients, thereby giving a mixture of the TVP, binder and additional ingredients having a moisture level of about 65 to about 75%, preferably about 67 to about 73%, on a weight basis.

Such specifically moisture-controlled mixture can be provided, for example, by the method to be explained below in the items (1) through (3).

(1) When the starting TVP has a hydration capacity of not less than 5 to about 10, preferably about 5.5 to about 9, and the moisture level of the dehydrated TVP from step (D) is about 75 to about 85%, such TVP is subjected to heat treatment for a time and at a temperature effective to attain a moisture level of about 65 to about 75%, preferably about 67 to about 73%, on a weight basis, and then combined with a hydrated binder and additional ingredients to give the desired moisture-controlled mixture. By the heat treatment, dehydration and denaturation of the TVP take place simultaneously.

(2) When the starting TVP has a hydration capacity of about 3 to less than 5, and the moisture level of the dehydrated TVP from step (D) is about 70 to about 85%, such TVP is also subjected to heat treatment for a time and at a temperature effective to attain the moisture level of about 65 to about 75%, preferably about 67 to about 73%, on a weight basis, and then combined with a hydrated binder and additional ingredients to give the desired moisture-controlled mixture. By the heat treatment, the dehydration of the TVP mainly takes place although the TVP may be denatured to some extent.

(3) When the starting TVP has a hydration capacity of about 3 to less than 5 and the moisture level of the dehydrated TVP from step (D) is especially about 70 to about 78%, such TVP may be directly combined with a binder and additional ingredients without hydration to give the desired moisture-controlled mixture.

The method of providing the desired moisture-controlled mixture in accordance with the items (1) and (2) employing the heat treatment will be described below.

Heating of pretreated TVP can be accomplished in a variety of ways. For example, microwave oven, conventional oven, autoclave or others can be used for heating. These have some shortcomings in efficiency, controllability of denaturation intensity and attainable extent of dehydration for the embodiment of the present invention. In the present invention, it is preferable to use far infrared rays (F.I.R.). Hereinafter, an embodiment in which F.I.R. is used will be described in detail. However, it would be apparent to one skilled in the art that other heating means may also be used similarly.

Far infrared rays having wavelengths ranging from 4 to 1,000 microns and preferably from 5 to 100 microns, can be specifically absorbed to an appropriate depth by moisture and protein-rich foodstuff exerting prominent dehydration effect without excessively elevated temperature. The features of F.I.R. are especially favorable to simultaneous dehydration and denaturation wherein the material to be subjected has high hydration capacity of not less than 5 to about 10, preferably about 5.5 to about 9 and high protein content. The range of F.I.R. wavelengths to be generated is inherent to the composition of ceramic coatings on the heater, and the amount of F.I.R. emitted is proportional to the temperature of the heater. The intensity of the effect on F.I.R. irradiation is controllable by the heater capacity, duration of irradiation, temperature of the heater and the distance between heater and material to be irradiated. Therefore, the optimal effect is easily obtained in the case of F.I.R. irradiation by modifying the combinations of each condition of contributing factor.

In the present invention, the disintegrated and dehydrated TVP from step (D) is preferably subjected to a heat treatment such as F.I.R. irradiation with continuous heating tunnel in step (E). Since, when the starting TVP has a hydration capacity of not less than 5 to about 10, the degree of denaturation of the TVP by heating generally correlates to the resultant decrease in the moisture level thereof, the desired degree of denaturation and therefore desired level of chewiness can be attained by conducting the heat treatment such as F.I.R. irradiation so as to decrease the moisture level to a certain range. As stated in the item (1) above, when the starting TVP has a hydration capacity of not less than 5 to about 10 and the moisture level of the dehydrated TVP from step (D) is about 75 to about 85%, the heat treatment such as F.I.R. irradiation is preferably conducted so as to adjust the moisture level of the resulting TVP to about 65 to about 75%. In this case, it is preferable that the moisture level of the TVP decreases by about 10% during the heat treatment.

When the starting TVP has a hydration capacity of about 3 to less than 5, the degree of denaturation of such TVP is usually almost sufficient and therefore it is generally important to adjust the moisture level of the dehydrated TVP from step (D) by the heat treatment. Thus, as mentioned in the item (2) above, when the moisture level of the TVP from step (D) is about 70 to about 85%, the heat treatment such as F.I.R. irradiation is preferably conducted so as to adjust the moisture level of the TVP to about 65 to about 75%. In this case, it is preferable that the moisture level of the TVP decreases by about 5 to about 10% during the heat treatment.

When the moisture level of the heat treated TVP is greater than 75%, the final product often tends to become soft and less tightly bound. On the other hand, when the moisture level of the heat treated TVP is less than 65%, the final product tends to become too hard and tough, and at the same time excessive heat treatment wastes energy.

When the heat treatment is conducted using F.I.R. as the heating means, the preferred combination of irradiating conditions are as follows: (1) heater capacity: from about 100 to 200 Kcal. per hour for each kilogram of material to be subjected to treatment; (2) duration of irradiation: from about 5 to 20 minutes; (3) heater temperature: from about 200° to 350° C.; 4) distance between heater and material: from about 50 to 200 mm. The temperature of F.I.R. treated TVP at the outlet of the tunnel is from about 50° to 90° C. This moderate elevation in temperature during F.I.R. irradiation enables the progression of proteinous denaturation which is responsible for the development of desired texture or the dehydration of the TVP, well controllable.

The heat-treated TVP may then be minced, if necessary, in accordance with the product to be simulated. For example, TVP cut into the particle size of ground meat is preferable for simulation of hamburger patty and sausage, and the particle size of coarse sawdust is suitable for meat loaf, poultry or fish product. Ham analog is prepared with roughly cut TVP into flakes. All these cuttings, from particle size of flake to coarse sawdust, are carried out by use of conventional equipment such as the speed cutter changing the rotation speed of blades and the duration of cutting time.

Then, a binder is mixed with the heat-treated TVP. To simulate the cohesive and chewy properties of meat products, a binder that coagulates upon heating is preferable. Various conventional binders such as egg albumin, caseinates, gluten, gelatin, wheat flour or soya flour, alginates, pectins and the mixtures thereof can be used in the invention.

In forming a variety of all-vegetable meat analogs within the scope of present invention, the use of vegetable protein, preferably soybean protein isolate of which binding properties are known in the art, is preferred. Usually a hydrated form of moist tacky paste is preferred because of its dispersibility on mixing. This hydrated form of binder is also more favorable than dry powder form as a carrier of additional ingredients, for even delivery, which impart desirable flavor and appearance to the product. Suitable binder for use herein can comprise from about 10 to about 40%, preferably from about 20 to about 30%, by weight, soybean protein isolate and from about 60 to about 90%, preferably from about 70 to about 80%, by weight, water.

The amount of the binder should be sufficient to provide heat-treated TVP bound together to the desired extent on heat sterilization, but should not be in excess, in order to avoid the development of gummy texture. The particular amount of binder most suitably employed will, of necessity, vary with the analogous product desired. In general, the ratio (wet weight basis) of binder to heat-treated TVP will be in the range of from about 1:3 to 1:10, and more preferably from about 1:4 to 1:7.

The meat analogs of this invention may contain additional ingredients conventionally used in the art to impart desirable flavor and appearance characteristics to the product. These additional ingredients are well-known in the art and include edible ingredients such as flavoring agents, coloring agents and the like. Representative thereof are commercially available various meat flavors of plant protein hydrolyzates, fish extracts, synthetic ham and sausage flavors, caramels and beet red color extracts. Additionally, various herbs, spices and salts can be employed to provide further flavor. Methionine sulfoxide may also be added to improve the nutritional amino acids composition of the soybean protein based product. Dietary fibers may also be incorporated into the binder. While the amount of the above-mentioned additional ingredients can vary over a wide range, the amount of these additional ingredients are within the knowledge of the art and should not so dilute the binder such that it becomes ineffective. It is preferable to mix these additional ingredients with the binder prior to combining the binder with heat-treated TVP, to provide more even distribution of the additional ingredients. A variety of known operations can be employed to coat heat-treated TVP with the mixture of binder and additional ingredients; for example, mixing or kneading by ribbon blender or double motion kneader is satisfactory. Generally the use of the above hydrated binder and additional ingredient in an amount specified above will give the desired moisture-controlled mixture having a moisture level of about 65 to about 75%, preferably about 67 to about 73%.

As stated in the item (3) above, when the starting TVP has a hydration capacity of about 3 to less than 5 and the moisture level of the dehydrated TVP from step (D) is especially about 70 to about 78%, the foregoing binder and additional ingredients may be directly added as such without hydration to the TVP from step (D) under agitation. In this case, the TVP having a hydration capacity of more than about 3 but less than 5 used usually tends to be less tightly bound by the binder than the TVP having a hydration capacity of not less than 5 to about 10, and therefore the binder is preferably used in an increased amount, for example, in an amount increased by about 20 to about 50% by weight based on the amount usually used for the case wherein the TVP having hydration capacity of not less than 5 to about 10 is used as the starting material, whereby the binder and/or additional ingredients can be admixed with the TVP and the moisture level of the resulting mixture can be decreased by about 3 to about 5% compared to the moisture level of the dehydrated TVP from step (D), and thereby the moisture level can be controlled. Thus the binder and additional ingredients are added as such without hydration in an amount such that the moisture level of the resulting mixture can be adjusted to about 65 to about 75%, preferably about 67 to about 73%. In this embodiment, too, the dehydrated TVP from step (D) before combining with a binder and additional ingredients may be minced, if desired, into a particle size of coarse sawdust to flake, in accordance with the product to be simulated.

The mixture of TVP, binder and additional ingredients prepared by any of the methods of the above items (1) through (3) can be formed into any shape desired wherein all the components are in intimate contact.

In step (F), the mixture is then stuffed into an appropriate casing by a stuffer, avoiding incorporation of air into the mixture. For the production of fowl or fish analogs, the honeycombed disc strainer of which pore size is from about 5 to 20 mm, preferably from about 10 to 15 mm, is placed in the filling tube of the stuffer for paralleled alignment of fiber bundles during the passage of the mixture through the strainer. The open area ratio of the strainer should be greater than about 60%, preferably greater than about 75%, to alleviate the pressure loss. The mixture stuffed in casing is held by the retainer of corresponding size, except for simulation of sausage analog, to keep the mixture in shape and strengthen the binding.

Then the mixture is subjected to the heat-setting and sterilization by heating in step (G). Heating can be accomplished in a variety of ways such as boiling, steaming and the like for a time and at a temperature effective to complete the binding and sterilization. Typically, the internal temperature of the product should be held within the range from about 63° to 100° C. for from about 30 to 120 minutes to obtain a desired final texture and sterility, although total time required for heat-setting and sterilization at a particular temperature will vary significantly depending on the size and shape of the product being subjected to treatment.

The product can then be cooled, frozen, and stored.

The frozen product is thawed before use, cut into piece of any shape desired and then cooked.

Cooking may be accomplished by frying, baking, broiling, microwaving, or any other method used for heating.

The cooked product has closely similar texture and flavor to those of comparable product simulated.

The process of the invention is especially advantageous for producing all-vegetable mean analog which resembles cooked beef steak in appearance, flavor, eating qualities and texture.

In order to further illustrate and further explain the present invention the following examples are presented, it being understood that the same are not to be taken as limiting in any sense. Unless otherwise indicated all parts or percentages are by weight.

EXAMPLE 1

Twenty kilograms of commercially available TVP of which hydration capacity is 6.7 times their weight was hydrated by soaking in about 50° C. sufficient water for 30 minutes.

The hydrated TVP was passed through the rice washer for elimination of undesirable flavor, then centrifuged by a horizontal continuous centrifuge at 225 G for further removal of undesirable flavor, dehydration and disintegration. The moisture level of centrifuged TVP was 82.5%. The diameter or the dimension of the sides of cross-sectioned columnar or pillar-shaped disintegrated fiber bundles ranged mostly from about 2 to 10 mm and were substantially free from the fractures in their length.

The centrifuged TVP was then introduced in the continuous F.I.R. irradiation tunnel wherein the heater capacity was 150 Kcal. per hour for each kilogram of centrifuged TVP for further dehydration and protein denaturation. The F.I.R. irradiative conditions of the heater temperature, distance between the heater and the material and duration of irradiation were 220° C., 150 mm and 15 minutes, respectively. The temperature and the moisture level of F.I.R. treated TVP at the outlet of the tunnel were 52° C. and 71%, respectively. The texture of F.I.R. treated TVP was organoleptically satisfactory.

To 1 part of soybean protein isolate, 4 parts of water was added and mixed thoroughly to give rise to a moist tacky binder by use of a speed cutter. To 8.76 kilograms of the binder, 170 grams of beet red color extract, 313 grams of caramel and 1200 grams of beef flavor of plant protein hydrolyzate were added and mixed thoroughly by a speed cutter for even dispersion.

Then, 10.443 kilograms of the uniform mixture of binder and additional ingredients were combined with 50 kilograms of F.I.R. treated TVP and mixed well until a uniform mix was obtained in a double motion kneader. The resulting mixture had a moisture level of 71%.

The mixture was stuffed into a 5½ inch diameter casing by a stuffer, and the stuffed mixture in casing was held in the retainer of which cross-section is steak-shaped, and then the retainer was placed in a boiling tank at 100° C. for 1 hour to complete the heat-set binding and the sterilization. Upon completion of heating, the product was cooled, removed from the retainer and frozen for storage.

The frozen product was thawed, cut into slabs, cubes, strips, slices and the like, and then cooled. The cooked pieces had closely similar texture and flavor to those of comparable pieces of cooked beef.

EXAMPLE 2

Three kilograms of F.I.R. treated TVP in Example 1 was minced into a particle size of ground meat by a speed cutter. To 450 grams of the binder prepared in the same manner as in Example 1, 70 grams of beef flavor of plant protein hydrolyzate, 17.4 grams of caramel, 9.3 grams of beet red color extract, 2 grams of pepper, 0.6 grams of garlic and 50 mg of nutmeg were added, and mixed thoroughly by the speed cutter. When the minced TVP and the uniform mixture of binder and additional ingredients were combined in a double motion kneader, the resulting mixture had a moisture level of 70.5%. Then 300 grams of minced and roasted onion separately prepared was added and all components were mixed well in the double motion kneader. Subsequent operations were similar to Example 1, except for stuffing the mixture into 4 inch diameter casing and the use of corresponding retainer. The product thawed, cut one-third inch thick, and cooked, had a closely similar texture and flavor to that of hamburger patty.

EXAMPLE 3

Two kilograms of F.I.R. treated TVP in Example 1 was minced into the particle size of coarse sawdust by a speed cutter. To 200 grams of the binder prepared in the same manner as in Example 1, 45 grams of beef flavor of plant protein hydrolyzate, 11.3 grams of caramel and 6 grams of beet red color extract were added, and mixed thoroughly by the speed cutter. When the minced TVP and the uniform mixture of binder and additional ingredients were combined in a double motion kneader, the resulting mixture had a mixture level of 70%. Then 500 grams of boiled green peas separately prepared was added and all components were mixed well in a double motion kneader. Subsequent operations were similar to Example 2 except for the use of another retainer of which cross-section is rectangular. The product thawed, baked in an oven and cut into slices had closely similar texture and flavor to that of meat loaf.

EXAMPLE 4

One kilogram of F.I.R. treated TVP in Example 1 was roughly minced into flakes by the speed cutter. To 160 grams of the binder prepared in the same manner as in Example 1, 25 grams of synthetic ham flavor and 2 grams of beet red color extract were added, and mixed thoroughly by the speed cutter. The minced TVP and the uniform mixture of binder and additional ingredients were then combined and mixed well until a uniform mix was obtained in the double motion kneader. The resulting mixture had a moisture level of 71%. The mixture was then stuffed into a 4 inch diameter casing by a stuffer, and the stuffed mixture in casing was held in the retainer of corresponding size. Subsequent operations were same as Example 1. The product thawed, cut into slices, and cooked had closely similar texture and flavor to that of smoked ham.

EXAMPLE 5

One kilogram of F.I.R. treated TVP in Example 1 was processed in the same manner as in Example 2 to obtain ground meat sized particles. To 150 grams of the binder prepared in the same manner as in Example 1, 25 grams of synthetic sausage flavor, 3 grams of caramel, 3 grams of beet red color extract and 0.5 grams of pepper were added and mixed thoroughly by the speed cutter.

The minced TVP and the uniform mixture of binder and additional ingredients were then combined and mixed well until a uniform mix was obtained in the double motion kneader. The resulting mixture had a moisture level of 70.5%. The mixture was stuffed into half inch edible collagen casing and the casing was twisted at 4 inches intervals. These links were subjected to heat-setting and sterilization by steam for 40 minutes. Upon completion of heating, the links were cooled, frozen and stored. The product thawed and cooked had closely similar texture and flavor to that of smoked sausage.

EXAMPLE 6

Out of 1 kilogram of F.I.R. treated TVP in Example 1, a half amount of the TVP was processed in the same manner as in Example 3 to obtain coarse sawdust sized particles and then combined with the remaining half. To 160 grams of the binder prepared in the same manner as in Example 1, 25 grams of chicken flavor of plant protein hydrolyzate and 1 gram of caramel were added and mixed thoroughly by the speed cutter. The combined TVP and the uniform mixture of binder and additional ingredients were mixed well until a uniform mix was obtained in the double motion kneader. The resulting mixture had a moisture level of 70.7%.

Subsequent operations were similar to Example 4 except for the placement of honeycombed strainer in filling tube of the stuffer for paralleled alignment of particles. The product thawed, cut into desired pieces and cooked had closely similar texture and flavor to cooked chicken white meat.

EXAMPLE 7

One kilogram of F.I.R. treated TVP in Example 1 was processed in the same manner as in Example 6. To 110 grams of the binder prepared in the same manner as in Example 1, 25 grams of bonito extract was added and mixed thoroughly by the speed cutter. The resulting mixture had a moisture level of 71.7%.

Subsequent operations were the same as in Example 6. The product thawed, cut into desired pieces, and cooked had similar texture and flavor to that of fish fillet.

EXAMPLE 8

A 42.1 kilograms quantity of commercially available TVP having a hydration capacity of 3.76 was hydrated by soaking in sufficient water at 50° C. for about 30 minutes in a vessel.

The hydrated TVP and water in the vessel was recycled with use of an inverter-controlled vertical pump having an impeller therein to the vessel. This recycling was conducted at 25 to 35 cycles for about 20 minutes to coarsely disintegrate the TVP to the degree such that the cross-sectional area of the resulting fiber bundle as hydrated generally ranged from about 1.0 $cm^2$ to about 4.0 $cm^2$.

The coarsely disintegrated TVP was passed through a rice washer together with water for washing.

The TVP thus washed was centrifuged by a horizontal continuous centrifuge at 220 G for simultaneous dehydration and disintegration, giving 123 kilograms of a disintegrated and dehydrated TVP having a moisture level of 77% by weight. The degree of disintegration was comparable to that of the disintegrated TVP in Example 1. This disintegrated and dehydrated TVP had a moisture level slightly higher than that of the F.I.R. treated TVP in Example 1, but had sufficient texture and chewiness.

The disintegrated and dehydrated TVP thus obtained was then combined with a binder and additional ingredients. Thus while agitating the TVP in a double motion kneader, soy protein isolate in the form of a powder (5,597 grams, corresponding to an amount that is 130% of the amount used in Example 1), 975 grams of beef flavor of plant protein hydrolyzate, 765 grams of caramel and 416 grams of beet red color extract were directly added in small amounts thereto. The resulting mixture had a moisture level of 72%.

The mixture was stuffed into a 5½ inch diameter casing by the stuffer, and the stuffed mixture in casing was held in the retainer of which cross-section is steak-shaped, and then the retainer was placed in a boiling tank at 100° C. for 1 hour to complete the heat-set binding and the sterilization. Upon completion of heating, the product was cooled, removed from the retainer and frozen for storage.

The frozen product was thawed, cut into slabs, cubes, strips, slices and the like, and then cooked. The cooked pieces had closely similar texture and flavor to those of comparable pieces of cooked beef.

EXAMPLE 9

A 10.3 kilograms of TVP having a hydration capacity of 3.76 was soaked in sufficient water at 50° C. for 30 minutes in a vessel.

The hydrated TVP and water in the vessel was recycled with use of an inverter-controlled vertical pump having an impeller therein as used in Example 8. This recycling was conducted at 30 to 40 cycles for about 30 minutes to disintegrate the TVP to the degree such that the cross-sectional area of the resulting fiber bundle as hydrated generally ranged from about 0.05 $cm^2$ to about 3.0 $cm^2$.

The disintegrated TVP was pumped out and fed to a rice washer together with water for washing.

The TVP thus washed was divided into 6 portions and each of the portions was dehydrated by a vertical batch-type centrifuge at 700 G for 15 minutes for dehydration, giving 30.1 kilograms of a dehydrated TVP having a moisture level of 77% by weight. This dehydrated TVP obtained by using the vertical batch-type centrifuge having substantially no disintegrating effect had substantially the same shape and size as those of the centrifuged TVP in Example 1, and had a moisture level slightly higher than that of the F.I.R. treated TVP in Example 1, but had sufficient texture and chewiness.

The disintegrated and dehydrated TVP thus obtained was then combined with a binder and additional ingredients. Thus while agitating the TVP in a double motion kneader, soy protein isolate in the form of a powder (1,365 grams, corresponding to an amount that is 130% of the amount used in Example 1), 268 grams of beef flavor of plant protein hydrolyzate, 187 grams of caramel and 102 grams of beet red color extract were directly added in small amounts thereto. The resulting mixture had a moisture level of 72%.

Subsequent operations were the same as in Example 8.

The frozen product was thawed, cut into slabs, cubes, strips, slices and the like, and then cooked. The cooked pieces had closely similar texture and flavor to those of comparable pieces of cooked beef.

While the invention has been described in detail and with reference to specific embodiments thereof, it will be apparent to one skilled in the art that various changes and modifications can be made therein without departing from the spirit and scope thereof.

I claim:

1. A process for the production of a low cholesterol all-vegetable meat analog from texturized vegetable protein (TVP) resembling a natural meat product in appearance, texture flavor, cooking characteristics, and eating qualities, comprising:
   (A) hydrating TVP;
   (B) disintegrating the TVP;
   (C) washing the TVP;
   (D) mechanically dehydrating the TVP;
   (E) denaturing and dehydrating, or dehydrating, the TVP from step (D) by heating and then combining the TVP with a hydrated binder, or combining the TVP from step (D) with a non-hydrated binder, thereby giving a mixture of the TVP and binder having a moisture level of about 65 to about 75% on a weight basis;
   (F) stuffing the mixture into a casing; and
   (G) heat-setting and sterilizing the stuffed mixture for a time and at a temperature effective to complete binding and sterilization, wherein the order of steps (B) and (C) may be reversed and the steps (B) and (D) may be conducted simultaneously.

2. A process according to claim 1 which comprises:
   (a) hydrating and washing TVP for removal of undesired flavor associated with soybean;
   (b) additionally washing and simultaneously dehydrating and disintegrating mechanically the hydrated and washed TVP;
   (c) denaturing and dehydrating by heating the TVP for a time and at a temperature effective to attain a moisture level of about 65 to 75% on a weight basis;
   (d) combining the TVP with a binder;
   (e) stuffing the mixture into a casing; and
   (f) heat-setting and sterilizing the stuffed mixture for a time and at a temperature effective to complete binding and sterilization.

3. A process according to claim 2 wherein TVP used in step (a) has a hydration capacity of from about 3 to about 10.

4. A process according to claim 2 wherein the hydrated and washed TVP is dehydrated to a moisture level of from about 75 to 85% by weight in step (b).

5. A process according to claim 2 wherein the TVP before hydration in step (a) has a hydration capacity of not less than 5 to about 10, and the hydrated and washed TVP is dehydrated to a moisture level of from about 75 to 85% in step (b).

6. A process according to claim 2 wherein the dehydrated TVP is disintegrated into fiber bundles of from about 2 to 15 mm in their cross-sectioned diameters or sides in step (b).

7. A process according to claim 2 wherein the disintegrated TVP from step (b) is subjected to far infrared rays irradiation with a heater having a capacity ranging from about 100 to 200 Kcal. per hour for each kilogram of material to be treated, for about 5 to 20 minutes at a heater temperature ranging from about 200° to 350° C. at from about 50 to 200 mm distance from the heater in step (c).

8. A process according to claim 2 comprising an additional step of mincing the denatured and dehydrated TVP into a particle size of from coarse sawdust to flakes after step (c).

9. A process according to claim 2 wherein the binder comprises soybean protein isolate.

10. A process according to claim 2 wherein the binder comprises of from about 10 to 40% soybean protein isolate and from about 60 to 90% water.

11. A process according to claim 10 wherein the binder is mixed with the TVP in a ratio on a wet weight basis of from about 1:3 to 1:10 in step (d).

12. A process according to claim 2 wherein the step (e) further comprises passing the mixture of denatured and dehydrated TVP and binder through a honeycombed strainer having a pore size from about 5 to 20 mm and an open area proportion greater than 60% placed in the filling tube of the stuffer.

13. A process according to claim 2 wherein the stuffed mixture in the casing is held at an internal temperature within the range from about 63° to 100° C. for from about 30 to 120 minutes in step (f).

14. A process according to claim 2 comprising:
(a) hydrating and washing TVP having a hydration capacity of not less than 5 to about 10 for removal of undesired flavor associated with soybeans;
(b) additionally washing and simultaneously dehydrating and disintegrating mechanically the hydrated and washed TVP so as to provide columnar or pillar-shaped fiber bundles of about 2 to about 15 mm in their cross-sectioned diameters or sides and having a moisture level of about 75 to about 85% on a weight basis;
(c) denaturing and dehydrating the TVP by irradiation of far infrared rays for a time and at a temperature effective to attain a moisture level of about 65 to about 75% wherein the irradiation of the far infrared rays is conducted with a heater having a capacity ranging from about 100 to 200 Kcal. per hour for each kilogram of material to be treated, for about 5 to about 20 minutes at a heater temperature ranging from about 200° C. to 350° C. at from about 50 to 200 mm distance from the heater in step (c);
(d) combining the TVP with a binder wherein the binder comprises about 20 to about 30% by weight of soybean protein isolate and about 70 to about 80% by weight of water and wherein the binder is mixed with the TVP in a weight ratio of about 1:4 to about 1:7;
(e) stuffing the mixture into a casing; and
(f) heat-setting and sterilizing the stuffed mixture for about 30 to 120 minutes and at an internal temperature of about 63° to about 100° C.

15. A process according to claim 1 comprising:
(A) hydrating TVP having a hydration capacity of about 3 to about 10;
(B) disintegrating the TVP;
(C) washing the TVP;
(D) mechanically dehydrating the TVP to a moisture level of about 70 to about 85% on a weight basis;
(E) denaturing and dehydrating, or dehydrating, the TVP from step (D) by heating and then combining the TVP with a hydrated binder, or combining the TVP from step (D) with a non-hydrated binder, thereby giving a mixture of the TVP and binder having a moisture level of about 65 to about 75% on a weight basis;
(F) stuffing the mixture into a casing; and
(G) heat-setting and sterilizing the stuffed mixture for a time and at a temperature effective to complete binding and sterilization, wherein the order to steps (B) and (C) may be reversed and the steps (B) and (D) may be conducted simultaneously.

16. A process according to claim 15 wherein the TVP from step (D) has a size and shape such that the diameter or dimension of the sides of the cross-sectioned columnar or piller-shaped fiber bundle ranges from about 2 to about 15 mm and such that there is no substantial reduction of the length of the fiber bundle.

17. A process according to claim 15 comprising:
(A) hydrating TVP having a hydration capacity of not less than 5 to about 10;
(B) disintegrating the TVP;
(C) washing the TVP;
(D) mechanically dehydrating the TVP to a moisture level of about 75 to about 85% on a weight basis;
(E) denaturing and dehydrating the TVP from step (D) by heating for a time and at a temperature effective to attain a moisture level of about 65 to 75% on a weight basis and then combining the TVP with a hydrated binder, thereby giving a mixture of the TVP and binder having a moisture level of about 65 to 75% on a weight basis;
(F) stuffing the mixture into a casing; and
(G) heat-setting and sterilizing the stuffed mixture for a time and at a temperature effective to complete binding and sterilization.

18. A process according to claim 16 comprising:
(A) hydrating TVP having a hydration capacity of about 3 to less than 5;
(B) disintegrating the TVP;
(C) washing the TVP;
(D) mechanically dehydrating the TVP to a moisture level of about 70 to about 85% on a weight basis;
(E) denaturing and dehydrating, or dehydrating the TVP by heating for a time and at a temperature effective to attain a moisture level of about 65 to about 75% on a weight basis and combining the TVP with a hydrated binder, thereby giving a mixture of the TVP and binder having a moisture level of about 65 to about 75% on a weight basis;

(F) stuffing the mixture into a casing; and (G) heat-setting and sterilizing the stuffed mixture for a time and at a temperature effective to complete binding and sterilization.

19. A process according to claim 16 comprising:

(A) hydrating TVP having a hydration capacity of about 3 to less than 5;

(B) disintegrating the TVP;

(C) washing the TVP;

(D) mechanically dehydrating the TVP to a moisture level of about 70 to about 78% on a weight basis;

(E) combining the TVP with a non-hydrated binder, thereby giving a mixture of the TVP and binder having a moisture level of about 65 to about 75% on a weight basis;

(F) stuffing the mixture into a casing; and (G) heat-setting and sterilizing the stuffed mixture for a time and at a temperature effective to complete binding and sterilization.

20. A process according to claim 15 wherein the TVP from step (D) has size and shape such that the diameter or dimension of the sides of the cross-sectioned columnar or piller-shaped fiber bundle ranges from about 2 to about 15 mm and such that there is no substantial reduction of the length of the fiber bundle, and the binder comprises soybean protein isolate.

21. A process according to claim 20 which comprises:

(A) hydrating TVP having a hydration capacity of not less than 5 to about 10;

(B) disintegrating the TVP;

(C) washing the TVP;

(D) mechanically dehydrating the TVP to a moisture level of about 75 to about 85% on a weight basis;

(E) denaturing and dehydrating, or dehydrating the TVP by irradiation of far infrared rays for a time and at a temperature effective to reduce the moisture level thereof by about 10% by weight and thereby to attain a moisture level of about 65 to about 75% on a weight basis and combining the TVP with a hydrated binder, wherein the binder comprises about 10 to about 40% by weight of soybean protein isolate and about 60 to 90% by weight of water, thereby giving a mixture of the TVP and binder having a moisture level of about 65 to about 75% on a weight basis;

(F) stuffing the mixture into a casing; and (G) heat-setting and sterilizing the stuffed mixture for a time and at a temperature effective to complete binding and sterilization.

22. A process according to claim 21 wherein the hydrated binder is mixed with the TVP and a weight ratio of from about 1:3 to 1:10.

23. A process according to claim 20 comprising:

(A) hydrating TVP having a hydration capacity of about 3 to less than 5;

(B) disintegrating the TVP;

(C) washing the TVP;

(D) mechanically dehydrating the TVP to a moisture level of about 70 to about 78% on a weight basis;

(E) combining the TVP with a non-hydrated binder, thereby giving a mixture of the TVP and binder having a moisture level of about 65 to about 75% on a weight basis;

(F) stuffing the mixture into a casing; and (G) heat-setting and sterilizing the stuffed mixture for a time and at a temperature effective to complete binding and sterilization.

24. A process according to claim 23 which comprises:

(A) hydrating TVP having a hydration capacity of about 3 to less than 5;

(B) disintegrating the TVP into fiber bundles which, in their hydrated form, have a cross sectional area of from about 0.05 to about 3 cm$^2$;

(C) washing the TVP;

(D) mechanically dehydrating the TVP to a moisture level of about 70 to about 78% on a weight basis to provide columnar or pillar-shaped fiber bundles of about 2 to about 15 mm in their cross-sectioned diameters or sides;

(E) combining the TVP with a non-hydrated binder, thereby giving a mixture of the TVP and binder having a moisture level of about 65 to about 75% on a weight basis;

(F) stuffing the mixture into a casing; and (G) heat-setting and sterilizing the stuffed mixture for about 30 to about 120 minutes and at an internal temperature of about 63° to about 100° C. to complete binding and sterilization.

25. A process according to one of claims 1, 2, 15, 17, 18, 19, 21, 23, 24 or 14 wherein the combining of the TVP with said binder comprises combining the TVP, the binder and additional ingredients selected from the group consisting of a flavoring agent, a coloring agent, a nutritional agent, and mixtures thereof.

26. A process according to claim 15 which comprises an additional step of mincing the dehydrated TVP from step (D) into particle size of from coarse saw dust to flakes prior to step (E).

27. A process according to claim 15 which further comprises a step of passing the mixture of the TVP and binder from step (E) through a honeycombed strainer having a pore size from about 5 to about 20 mm and an open area ratio greater than about 60% in step (F).

28. A process according to claim 15 wherein the stuffed mixture in the casing is held at an internal temperature within the range from about 63° to about 100° C. for from about 30 to 120 minutes in step (G).

* * * * *

UNITED STATES PATENT AND TRADEMARK OFFICE
CERTIFICATE OF CORRECTION

PATENT NO. : 4,863,749

DATED : September 5, 1989

INVENTOR(S) : Tetsu YAMADA

It is certified that error appears in the above-identified patent and that said Letters Patent is hereby corrected as shown below:

Column 6, line 3, delete "proteins" and insert --proteinous--.

Column 10, line 31, delete "mean" and insert --meat--.

Column 12, line 64, delete "71.7%" and insert --71.8%--.

Column 15, line 1, after "wherein" insert --the--.

Column 15, line 31, delete "of".

Column 16, delete lines 28, 29 and 30 and insert the following

--binding and sterilization, wherein the order of steps (B) and (C) may be reversed and the steps (B) and (D) may be conducted simultaneously.--

UNITED STATES PATENT AND TRADEMARK OFFICE
CERTIFICATE OF CORRECTION

PATENT NO. : 4,863,749

DATED : September 5, 1989

INVENTOR(S) : Tetsu Yamada

It is certified that error appears in the above-identified patent and that said Letters Patent is hereby corrected as shown below:

Column 16, line 37, delete "15" and insert --16--.

Column 17, line 22, after "has" insert --a--.

Signed and Sealed this

Ninth Day of April, 1991

Attest:

HARRY F. MANBECK, JR.

*Attesting Officer*     *Commissioner of Patents and Trademarks*